(12) United States Patent
Wilhelmsson et al.

(10) Patent No.: US 7,415,270 B2
(45) Date of Patent: Aug. 19, 2008

(54) MIDDLEWARE SERVICES LAYER FOR PLATFORM SYSTEM FOR MOBILE TERMINALS

(75) Inventors: Lars Wilhelmsson, Lund (SE); Björn Bjäre, Lund (SE); Jonas Hansson, Lund (SE); Chi Thu Le, Lund (SE); Sebastian Weber, Malmö (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 895 days.

(21) Appl. No.: 10/359,772

(22) Filed: Feb. 7, 2003

(65) Prior Publication Data

US 2003/0181193 A1 Sep. 25, 2003

Related U.S. Application Data

(60) Provisional application No. 60/412,844, filed on Sep. 23, 2002, provisional application No. 60/412,756, filed on Sep. 23, 2002, provisional application No. 60/357,291, filed on Feb. 15, 2002, provisional application No. 60/357,366, filed on Feb. 15, 2002.

(51) Int. Cl.
*H04M 3/00* (2006.01)
(52) U.S. Cl. ............... 455/419; 455/414.1; 455/418
(58) Field of Classification Search ............ 455/414.1, 455/466, 418, 424, 556.1, 557, 419; 709/218.1, 709/223, 217, 235; 370/254, 466
See application file for complete search history.

(56) References Cited

U.S. PATENT DOCUMENTS 3,831,148 A  8/1974  Greenwald et al.
5,689,565 A  11/1997  Spies et al. ............ 380/25
5,771,240 A  6/1998  Tobin et al.
5,937,366 A  8/1999  Zbytniewski et al.
6,002,869 A  12/1999  Hinckley
6,044,408 A  3/2000  Engstrom et al.
6,049,896 A  4/2000  Frank et al.
6,052,524 A  4/2000  Pauna
6,061,709 A  5/2000  Bronte
6,105,154 A  8/2000  Wang et al.

(Continued)

FOREIGN PATENT DOCUMENTS

| EP | 0902596 A2 | 3/1999 |
| EP | 1 074 911 A2 | 2/2001 |
| EP | 1 136 912 A2 | 9/2001 |
| EP | 1241905 A1 | 9/2002 |
| WO | WO-97/16938 | 5/1997 |

(Continued)

OTHER PUBLICATIONS

U.S. Appl. No. 10/606,684.

(Continued)

*Primary Examiner*—Barry W Taylor
(74) *Attorney, Agent, or Firm*—Michael Cameron

(57) ABSTRACT

A middleware services layer for a platform system for a mobile terminal for a wireless telecommunications system, the platform system including a mobile terminal platform assembly having a software services component, and application software loaded, installed and run in said mobile terminal platform assembly. The middleware services layer comprises at least one application programming interface (API) for providing access to the mobile terminal platform assembly for loading, installing and running application software in said mobile terminal platform assembly; and, at the same time, isolates the platform assembly from the applications via the at least one API.

22 Claims, 5 Drawing Sheets

U.S. PATENT DOCUMENTS

| | | | |
|---|---|---|---|
| 6,112,312 | A | 8/2000 | Parker et al. |
| 6,137,802 | A | 10/2000 | Jones et al. |
| 6,269,396 | B1 | 7/2001 | Shah et al. ............... 709/223 |
| 6,279,124 | B1 | 8/2001 | Brouwer et al. |
| 6,317,659 | B1 | 11/2001 | Lindsley et al. ............... 701/1 |
| 6,353,897 | B1 | 3/2002 | Nock et al. |
| 6,389,491 | B1 | 5/2002 | Jacobson et al. |
| 6,600,917 | B1* | 7/2003 | Maupin ............... 455/414.1 |
| 6,908,389 | B1* | 6/2005 | Puskala ............... 463/40 |
| 6,918,108 | B2* | 7/2005 | Rajaram ............... 717/126 |
| 2001/0015654 | A1 | 8/2001 | Habersetzer et al. |
| 2002/0029378 | A1 | 3/2002 | Larsson ............... 717/159 |
| 2002/0069065 | A1 | 6/2002 | Schmid et al. ............... 704/270 |
| 2002/0069263 | A1* | 6/2002 | Sears et al. ............... 709/218 |
| 2002/0098855 | A1* | 7/2002 | Hartmaier et al. ............... 455/466 |
| 2003/0182347 | A1* | 9/2003 | Dehlinger ............... 709/1 |
| 2003/0224769 | A1* | 12/2003 | Solve et al. ............... 455/418 |

FOREIGN PATENT DOCUMENTS

| | | |
|---|---|---|
| WO | WO 98/19239 | 5/1998 |
| WO | WO 99/49394 | 9/1999 |
| WO | WO 00/08611 | 2/2000 |
| WO | WO-00/69084 | 11/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/51940 A1 | 7/2001 |
| WO | WO 01/88707 A2 | 11/2001 |
| WO | WO 02/27565 | 4/2002 |
| WO | WO 02/29824 | 4/2002 |
| WO | WO 02/33879 A2 | 4/2002 |
| WO | WO 02/35351 A1 | 5/2002 |
| WO | WO 02/054094 | 7/2002 |

OTHER PUBLICATIONS

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia. Lausanne, CH, vol. 17, No. 1, 1995, pp. 55-62, no month listed.

U.S. Appl. No. 10/359,911.
U.S. Appl. No. 10/359,835.
U.S. Appl. No. 10/666,699.
U.S. Appl. No. 10/666,673.
U.S. Appl. No. 10/664,618.
U.S. Appl. No. 10/665,834.

Manuel Rodriguez-Martinez et al., "Automatic Deployment of Application-Specific Metadata and Code in MOCHA", Lecture Notes in Computer Science, Mar. 31, 2000 (pp. 69-85).

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway, vol. 1, Sep. 18, 2000 (pp. 484-489).

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability—The Optima Framework" 3G Mobile Communication Technologies, No. 477, XP002266662, Mar. 26-28, 2001, (pp. 241-246).

K. Moessner, et al., "Terminal Reconfigureability—The Software Download Aspect", 3G Mobile Communication Technologies, Conference Publication, No. 471, XP002266663, (pp. 326-330), no date listed.

Aspects & Crosscutting in Layered Middleware Systems by Lodewijk M.J. Bergmans et al.; Trese Group-Center for Telematics and Information Technology (CTIT); pp. 1-3, no date listed.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

A Layered Approach to Building Open Aspect-Oriented Systems by Paniti Netinant et al.; Communications of the ACM; Oct. 2001; vol. 44, No. 10; pp. 83-85.

Aspect-Oriented Programming by Silvia Breu; pp. 1-22, no date listed.

Draft: Aspect-Design in the Building-Block Method by Jürgen K. Müller; Philips Research Laboratories; International Workshop on Aspect-Oriented Programming at ECOOP, 1992; 3 Pages, no month listed.

A Version Model for Aspect Dependency Management by Elke Pulvermüller et al.; J. Bosh (Ed.): GCSE 2001, LNCS 2186, Springer-Verlag Berlin Heidelberg 2001, pp. 70-79, no month listed.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages, no month listed.

* cited by examiner

MIDDLEWARE SERVICES LAYER FOR PLATFORM SYSTEM FOR MOBILE TERMINALS

This application claims the benefit of U.S. Provisional Patent Application Ser. No. 60/357,366 filed on Feb. 15, 2002, U.S. Provisional Patent Application Ser. No. 60/357,291 filed on Feb. 15, 2002, U.S. Provisional Patent Application Ser. No. 60/412,756 filed on Sep. 23, 2002, and U.S. Provisional Patent Application Ser. No. 60/412,844 filed on Sep. 23, 2002.

BACKGROUND OF THE INVENTION

1. Technical Field of the Invention

The present invention relates generally to the field of wireless telecommunications; and, more particularly, to an interface for a platform system for a mobile terminal for a wireless telecommunications system.

2. Description of Related Art

Since cellular telecommunications systems were first introduced in the 1980s, mobile terminals (Mobile Stations) utilized in the systems have become increasingly more complex. Initially, mobile terminals were designed primarily to provide voice telephony services; i.e., to receive and transmit voice communications. In later years, mobile terminals were developed that also included the ability to transfer user data not related to that of a voice telephone call. Such user data included, for example, data to be transferred over a dial-up networking connection initiated via a personal computer (PC).

Currently, so-called "third generation" (3G) systems are being developed for future mobile telecommunications systems. 3G systems will combine high-speed Internet access with traditional voice communication, and will provide a user with access to Internet browsing, streaming audio/video, positioning, video conferencing and many other capabilities in addition to voice communication.

The Third Generation Partnership Project (3GPP) was established to ensure compatibility among the several 3G systems that are being developed around the world. The Universal Mobile Telephone System (UMTS) is being developed by 3GPP to provide a 3G system that includes terrestrial and satellite systems capable of delivering voice, data and multimedia anywhere in the world.

The drastically increased functionality that is being included in cellular telecommunications systems via the 3GPP standardization has placed substantial demands on the developers of mobile terminals to be used in the systems. This demand is exacerbated by the fact that a mobile terminal is a "resource scarce" environment that is limited in size, memory and power.

Traditionally, mobile terminal manufacturers have designed, fabricated and marketed substantially complete mobile terminal systems that include all the hardware and software needed for basic terminal operation as well as the hardware and software needed to provide the features and capabilities desired by the manufacturer or a particular user based on their perception of market needs. Such an approach does not provide the flexibility to quickly adapt to rapid changes in market demands or to satisfy the diverse requirements of multiple users.

Recognizing the inadequacies of traditional procedures for designing and fabricating mobile terminals, a mobile terminal platform assembly has been developed that includes a plurality of functionally complementary units of software and hardware that can be marketed as a unit to a plurality of users. Each user can then load, install and run his own application software into the assembly to provide a complete platform system for a mobile terminal that meets the user's own particular needs. The mobile terminal platform assembly and the platform system are described in detail in commonly assigned U.S. patent application Ser. Nos. 60/357,366 and 60/357,291 filed concurrently herewith, the disclosures of which are hereby incorporated by reference.

A platform system such as described above, wherein mobile terminal platform assembly software and application software are developed separately and then later combined by loading, installing and running the application software in the mobile terminal platform assembly, requires a well-defined interface between the platform assembly software and the application software. Such an interface does not exist in current mobile terminals wherein all the software for the mobile terminals is fabricated together.

There is, accordingly, a need for an interface for a platform system for a mobile terminal for a wireless telecommunications system that permits software of a mobile terminal platform assembly of the system and application software to be developed separately and then later combined via the interface to complete the platform system.

SUMMARY OF THE INVENTION

The present invention provides an interface for a platform system for a mobile terminal for a wireless telecommunications system that permits software of a mobile terminal platform assembly of the platform system and application software to be developed separately and then later combined via the interface to complete the platform system.

According to the present invention, the interface comprises a middleware services layer that includes at least one application programming interface (API) for providing access to the mobile terminal platform assembly for loading, installing and running application software in the mobile terminal platform assembly (the term "loading" as used herein is intended to include any mechanism by which the application software can be combined with the software of the mobile terminal platform assembly via the interface, including, for example, downloading from the Internet or installing a hardware chip). The at least one API may include standardized (non-native) interfaces, de facto standardized interfaces and/or open native interfaces. For example, a standardized interface might include the J2ME (JAVA 2 Micro Edition) environment according to MIDP/CLDC (Mobile Information Device Profile/Connected Limited Device Configuration) API.

According to an exemplary embodiment of the present invention, the middleware services layer comprises a middleware services layer component of the mobile terminal platform assembly of the platform system. The middleware services layer component provides a plurality of APIs for loading, installing and running application software in the assembly to be combined with software of the assembly to provide a complete platform system; and, in addition, functions to encapsulate the mobile terminal platform assembly and to isolate the platform assembly from the applications via the APIs. As a result, the middleware services layer component provides users (the term "users" as used herein includes manufacturers, end users or other customers or users) with the capability of fully utilizing the functionality of the mobile terminal platform assembly without permitting access to or knowledge of the details of the assembly.

Further advantages and specific details of the middleware services layer of the present invention will become apparent hereinafter from the detailed description given below in conjunction with the following drawings.

DETAILED DESCRIPTION OF THE EXEMPLARY EMBODIMENTS OF THE INVENTION

Figure 1:
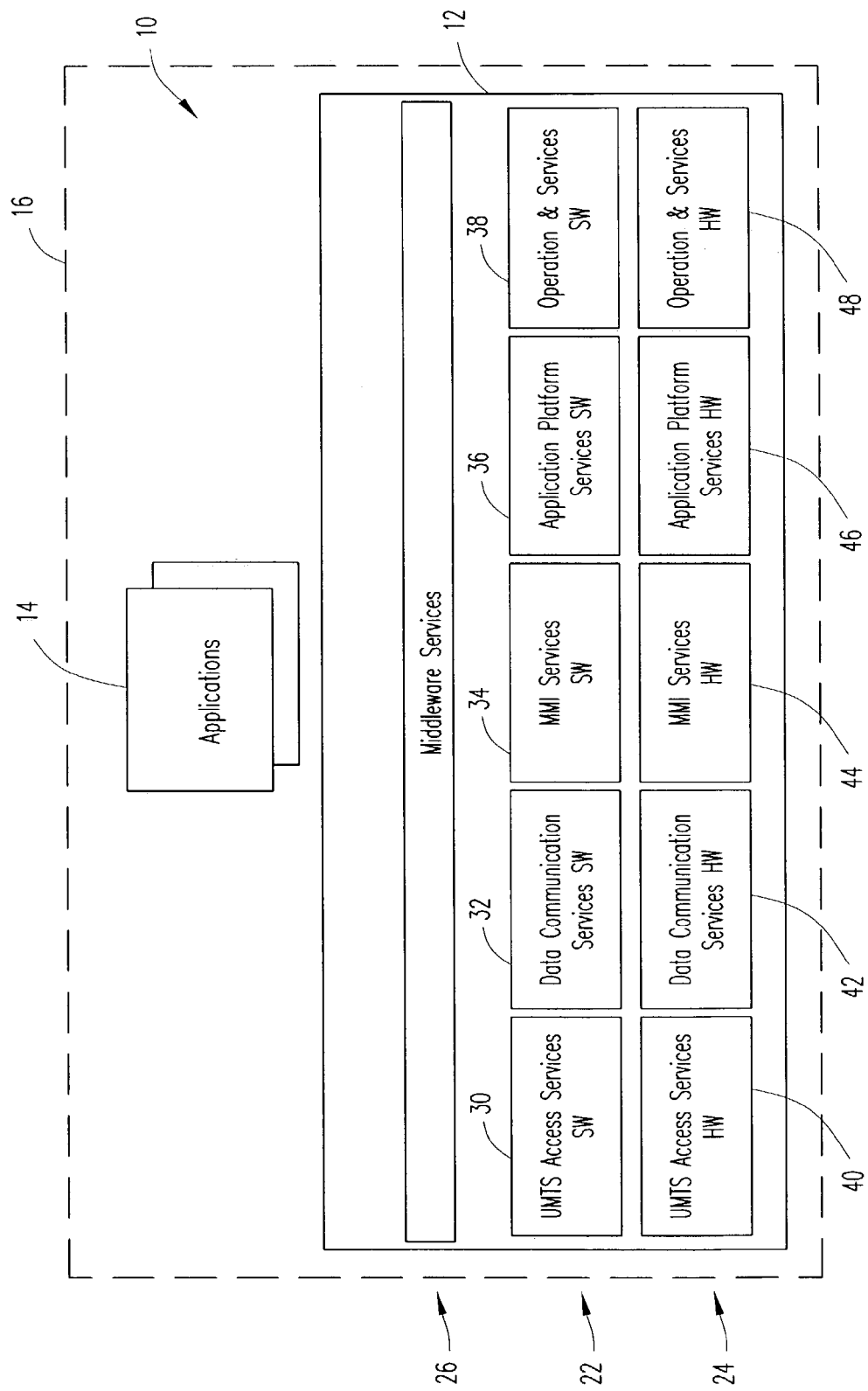
FIG. 1 is a block diagram that schematically illustrates a platform system for a mobile terminal for a wireless telecommunications system to assist in explaining the present invention.

FIG. 1 is a block diagram that schematically illustrates a platform system for a mobile terminal for a wireless telecommunications system to assist in explaining the present invention. The platform system is generally designated by reference number 10 and comprises a mobile terminal platform assembly 12 and one or more applications (i.e., application software) 14 that have been loaded, installed and run in the mobile terminal platform assembly. Platform system 10 is adapted to be incorporated in a mobile terminal generally designated by dotted line 16.

Mobile terminal platform assembly 12 includes a software services component 22, a hardware component 24 and an interface component 26.

Software services component 22 comprises a plurality of well-structured functional software units for providing services that are offered to users via the interface component 26. In the exemplary system illustrated in FIG. 1, the plurality of software units comprise a plurality of vertically-oriented functional stacks including a UMTS access services software stack 30, a data communications services software stack 32, an MMI (Man-Machine Interface) services software stack 34, an application platform services software stack 36 and an operation and services software stack 38.

The hardware component 24 comprises a set of hardware units that are associated with and controlled by their respective functional software stacks. In the exemplary system illustrated in FIG. 1, the hardware units include UMTS access services hardware 40, data communications services hardware 42, MMI services hardware 44, application platform services hardware 46 and operation and services hardware 48.

According to exemplary embodiments of the present invention, interface component 26 comprises a middleware services layer component that includes at least one application programming interface (API) for loading, installing and running one or more applications 14 in mobile terminal platform assembly 12, that isolates the mobile terminal platform assembly from the applications using it, and that provides various other services for the applications. Specific details of the middleware services layer component 26 will be described hereinafter.

Mobile terminal platform assembly 12 of platform system 10 is adapted to be designed, implemented (assembled) and tested as a complete, enclosed unit separate from the application software 14 (the term "application software" as used herein can be any software that provides the functionality that users may wish to have available). Users can, accordingly, develop or otherwise acquire their own application software and add that software to the mobile terminal platform assembly 12 at a later time in order to complete platform system 10. Mobile terminal platform assembly 12 can, accordingly, be sold or otherwise transferred to a plurality of different users each of which can complete platform system 10 by loading, installing and running their own application software in the assembly in order to satisfy their own particular requirements for the platform system.

Figure 2:
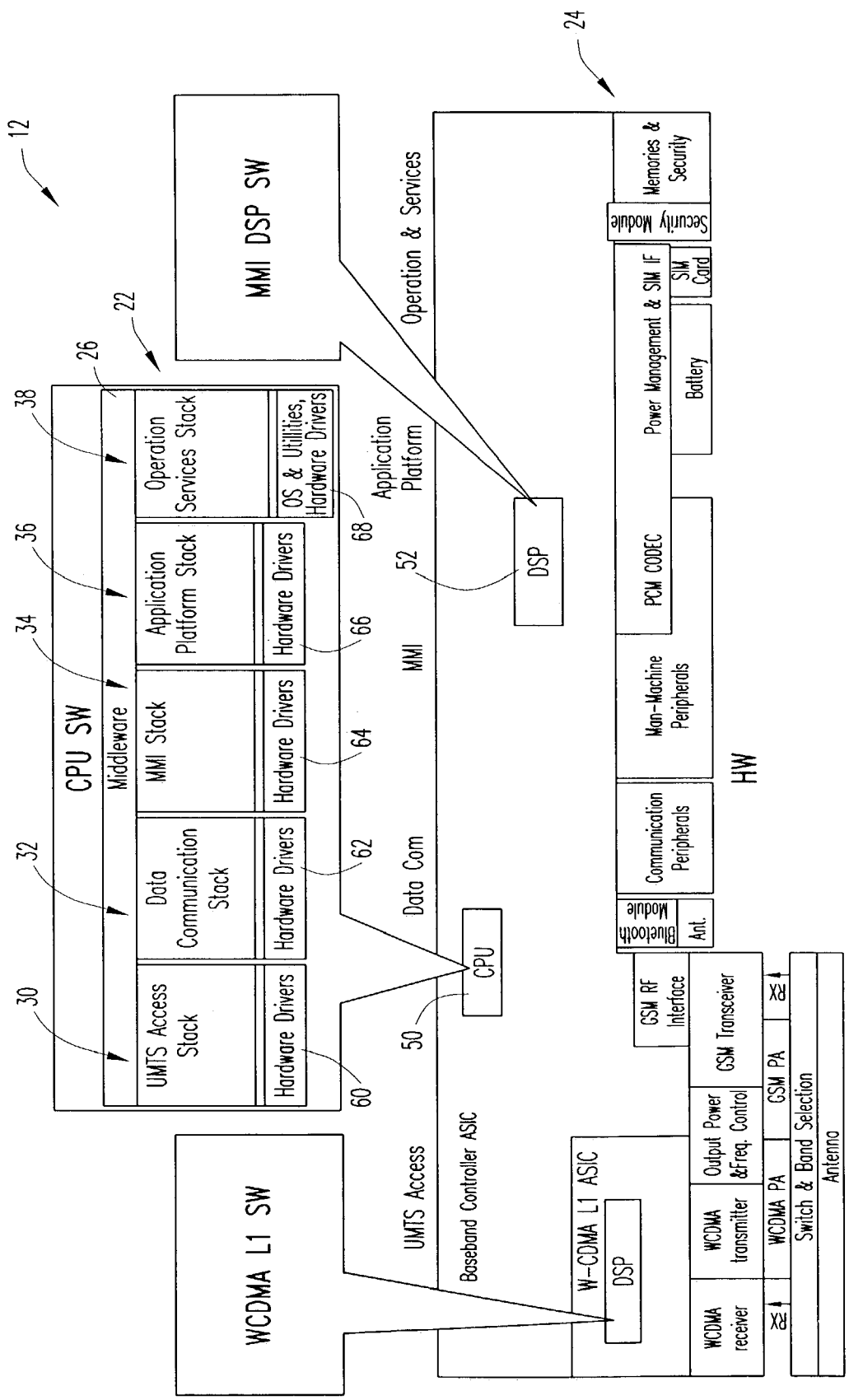
FIG. 2 is a block diagram that schematically illustrates a deployment view of the mobile terminal platform assembly of the platform system of FIG. 1 to further assist in explaining the present invention.

FIG. 2 is a block diagram that schematically illustrates one example of a deployment view of mobile terminal platform system 12 of FIG. 1 to further assist in understanding the present invention. As illustrated in FIG. 2, mobile terminal platform assembly 12 is controlled via software executing in a main CPU 50. The main CPU may comprise one or more processors such as microprocessors, micro programmable processors or DSPs (Digital Signal Processors). A DSP for the MMI software services stack 34 is illustrated at 52. The software stacks 30-38 of software component 22 each include hardware driver software 60-68 to operate the hardware units associated with each stack. As shown in FIG. 2, exemplary of the hardware units that are controlled by the functional software stacks include a receiver, a transmitter, a power and frequency controller, a GSM transceiver, a Bluetooth module, various communication and man-machine peripherals, power management and SIM interface, memories and security hardware.

Further details of the mobile terminal platform assembly 12 and platform system 10 are given in the above-mentioned commonly assigned U.S. patent application Ser. No. 60/357,291.

Figure 3:
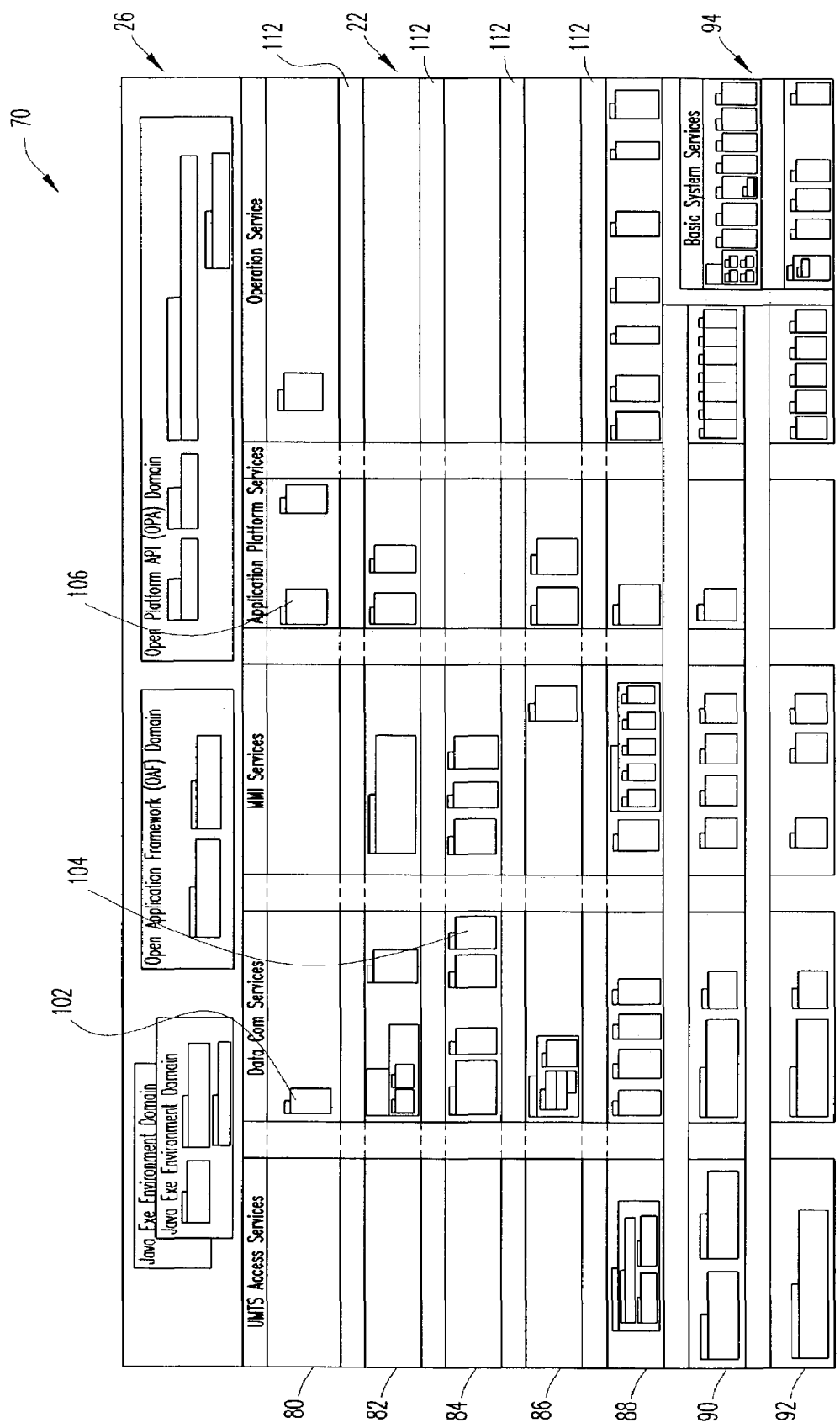
FIG. 3 is a block diagram that schematically illustrates the software architecture of the mobile terminal platform assembly of FIGS. 1 and 2 to further assist in explaining the present invention.

The software incorporated in mobile terminal platform assembly 12 is preferably arranged in such a manner as to make the software organization easy to understand so that it can be more easily designed and more easily upgraded or otherwise modified. FIG. 3 is a block diagram that schematically illustrates the software architecture of mobile terminal platform assembly 12 to further assist in explaining the present invention.

As shown in FIG. 3, software services component 22, in addition to being organized into a plurality of vertical, functional software stacks as described above, is also arranged to define a plurality of horizontal layers such that the software of the middleware services layer 26 and the software of the software services component 22 together define a layered architecture, generally designated by reference number 70, in which the layers are arranged in descending order from a higher level service layer to a lower level service layer.

The software architecture differs from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular (service) components.

The highest layer of the layered architecture is the middleware services layer 26. The layers of the software services component 22 include an application server layer 80 to provide application services, a platform services layer 82 to provide platform specific services for applications, a platform protocol layer 84 to provide session protocols and application specific protocols, a transport layer 86 to provide audio access/control, datacom transport protocols, messaging transport protocols and the like, a data access layer 88 to provide external data IF access, structured storage services and other low level platform support services, a logical drivers layer 90 and a physical drivers layer 92 encapsulating hardware dependencies. In addition, software services component 22 includes basic system services layers 94 that provide general services that are needed by the platform assembly.

The bottom two layers 90 and 92 constitute Hardware Abstraction Layers (HAL) which isolate the dependencies between the software and the hardware. Only the physical drivers layer is concerned with the details of the hardware (i.e., which registers in the ASIC hardware are addressed). The logical drivers layer 90 provides a logical mapping to the hardware, i.e., this layer provides a bridge between the hardware and software parts of the mobile terminal platform assembly.

The software itself is organized into a plurality of software modules, e.g. modules 102, 104, 106. In software services component 22, a single module can reside in only one vertical functional stack and in only one horizontal layer within that stack. Each layer can contain from one to many modules, and all the modules in a particular layer in a particular stack have the same level of abstraction. Communication among the various modules is accomplished via a Software Back Plane (SwBP) 112 subject to a set of basic rules for software module-to-module access. These rules can be summarized as follows:

- A software module may invoke functionality in all layer interfaces below its own layer.
- There are no limitations for the direction of channel events or data streams. They may go in any direction.
- A software module may never invoke functionality in layer interfaces (in the SwBP) above its own layer, independent of to which module the layers belong.
- A software module may invoke functionality in the layer interface in its own layer in the same vertical stack.
- A software module may invoke functionality in a software module in the same layer in another vertical stack. (This capability is permitted to limit the number of layers in the vertical stacks.)

There is no hard coupling between the various modules and the interfaces in the SwBP. As a result, the modules and/or the implementation of the interfaces can be freely changed without any impact on the clients to the interfaces. This is an important capability as it permits individual modules to be added, removed or changed without affecting other modules in the platform assembly.

Further details of the layered architecture, including the SwBP software structure that enables the internal communication between modules within the mobile terminal platform assembly are described in the above-mentioned commonly assigned. U.S. patent application Ser. No. 60/357,366

Middleware services layer component 26 functions to provide a well-defined interface between the software in the mobile terminal platform assembly 12 and the application software 14 to be loaded, installed and run in the platform assembly; and, in addition, encapsulates the mobile terminal platform assembly and isolates the assembly from applications via the middleware services layer component, and provides various other services for the applications.

Figure 4:
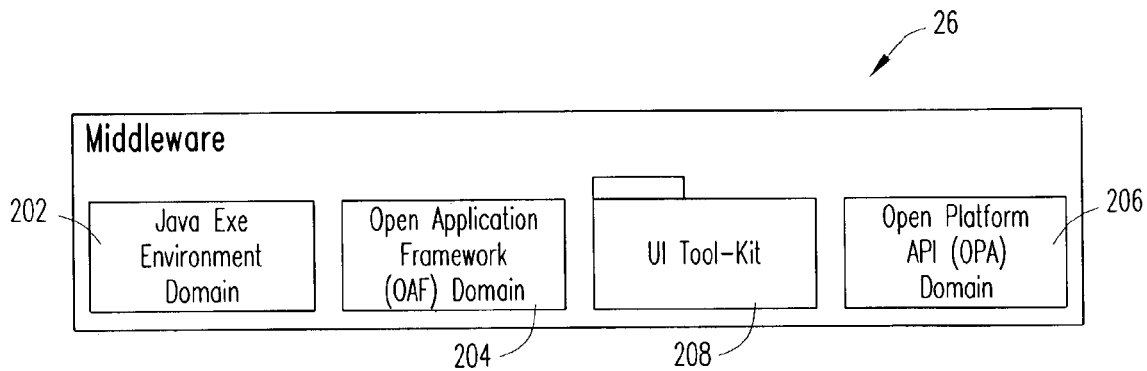
FIG. 4 is a block diagram that schematically illustrates details of the middleware services layer component of FIGS. 1-3 according to an exemplary embodiment of the present invention.

FIG. 4 is a block diagram that schematically illustrates details of middleware services layer component 26 according to an exemplary embodiment of the present invention. As shown in FIG. 4, middleware services layer component 26 comprises a plurality of API domains including Java Execution (Java ExE) Environment API domain 202, Open Application Framework (OAF) API domain 204, Open Platform API (OPA) domain 206 and UI Tool-kit API domain 208.

Through the APIs in the middleware services layer component 26, the mobile terminal platform assembly 12 supports a plurality of application environments. In the exemplary embodiment of FIG. 4, middleware services layer 26 supports environments for native applications (applications that are compiled to run with a particular processor and its set of instructions) and for non-native applications such as Java J2ME CLDC/MIDP (Java 2 Micro Edition Connected Limited Device Configuration/Mobile Information Device Profile) applications. Each application environment has its own characteristics and is defined as:

- The way applications are developed (programming language support, compilation and linkage).
- The way applications are executed (e.g., interpretation or native code execution)
- The functional services that are offered.
- Potential restrictions in use.

By providing multiple application environment alternatives, a wide range of products with varying demands such as cost, ease of use, time to market, functionality set, size, portability, etc. is facilitated.

Figure 5:
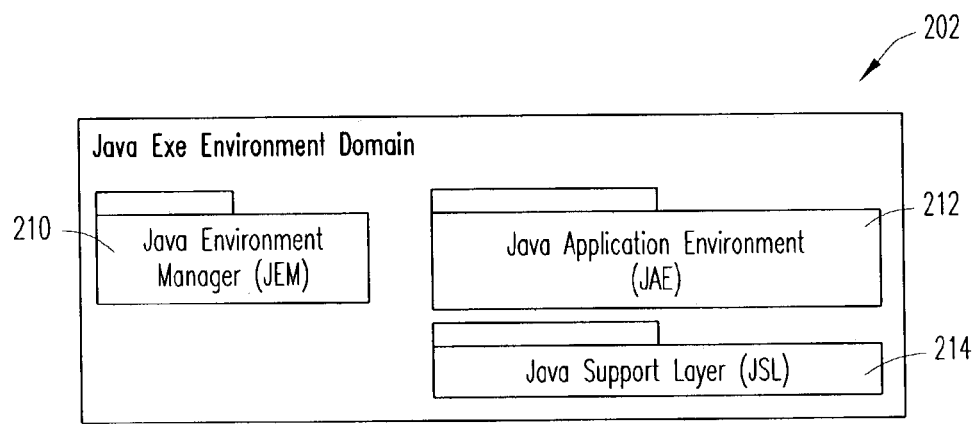
FIG. 5 is a block diagram that schematically illustrates details of the JAVA Execution Environment API domain of the middleware services layer component of FIG. 4 according to another exemplary embodiment of the present invention.

Each of the API domains comprises a plurality of software modules, and FIG. 5 is a block diagram that schematically illustrates the major software modules in the Java ExE environment API domain 202 according to an exemplary embodiment of the present invention. As shown, Java ExE Environment API domain 202 includes a Java Environment Manager (JEM) module 210, a Java Application Environment (JAE) module 212 and a Java Support Layer (JSL) module 214. JEM module 210 controls the Java application environment and the Java applications. JAE module 212 defines the environment within which the Java applications execute, and also contains the Java Virtual Machine (JVM), the J2ME MIDP libraries and the J2ME CLDC runtime libraries. JSL module 214 comprises a layer between JAE implementation and the mobile terminal platform assembly 12. It supplies an interface that makes it easier to port third-party Java environments to the platform assembly. JSL module 214 also contains an adaptation layer between the JVM and the platform assembly, Java VM Support Layer (JVMSL); and the adaptation layer between the CLDC and MIDP API implementation and the platform assembly, Java Library Support Layer (JLSL).

Figure 6:
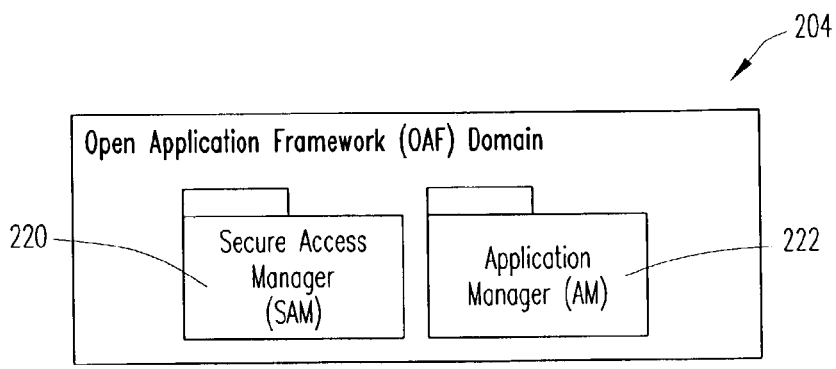
FIG. 6 is a block diagram that schematically illustrates details of the Open Application Framework API domain of the middleware services layer component of FIG. 4 according to another exemplary embodiment of the present invention.

FIG. 6 is a block diagram that schematically illustrates the major software modules in the Open Application Framework (OAF) API domain 204 according to another exemplary embodiment of the present invention. As shown, the modules include a Secure Access Manager (SAM) module 220 and an Application Manager (AM) module 222. SAM module 220 is responsible for granting access to the Open Platform API domain 206 made by non-native applications such as Java in order to monitor Java applications according to their credentials. That is, SAM module 220 has the responsibility to decide whether or not a call from a non-native environment should be permitted. In this regard, access to platform services by Java Exe Environment may be more restrictive than for the native application environment. AM module 222 is responsible for controlling the applications running in the non-native (Java) and native execution environments. The AM module intercepts a nonnative application between the EXE environment and the native platform services (at the border of the Java support layer in the case of a Java application), and calls on the SAM to grant access. If access is granted, the non-native application is forwarded to the OPA and treated the same as a native application. In general, AM module 222 handles the registration, installation, start, stop, uninstall and removal of all applications.

Figure 7:
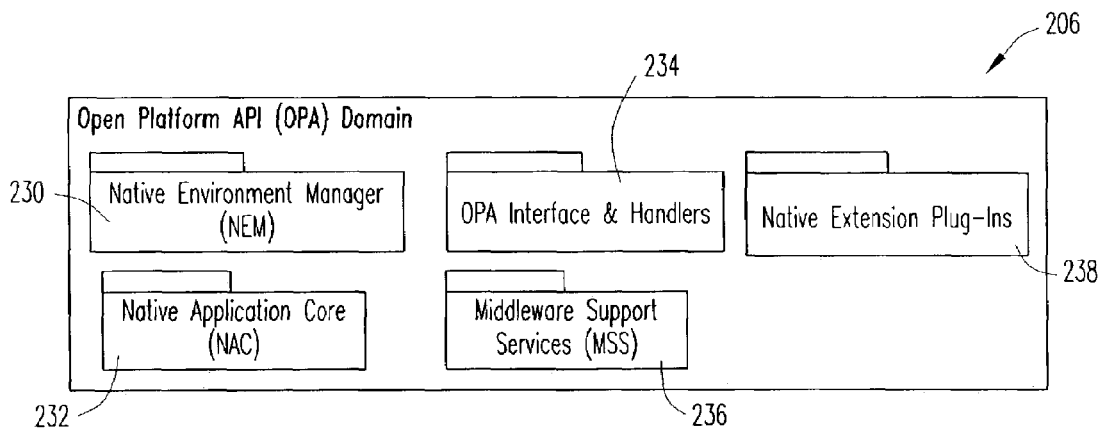
FIG. 7 is a block diagram that schematically illustrates details of the Open Platform API domain of the middleware services layer component of FIG. 4 according to another exemplary embodiment of the invention.

FIG. 7 is a block diagram that schematically illustrates the major software modules of the Open Platform (OPA) domain 206 according to an exemplary embodiment of the present invention. As illustrated, The OPA domain 206 includes five modules: the Native Environment Management (NEM) module 230, the Native Application Core (NAC) module 2232, the OPA Interface and Handlers module 234, the Middleware Support Services module 236 and the Native Extension Plug-in module(s) 238.

The Native Environment Management module 230 has the responsibility of controlling native applications in platform system 10. It is the recipient of the control commands concerning native applications from the Application Manager 222 (FIG. 6), and keeps track of native applications that are currently running in the system.

The Native Application Core module 232 administers and takes care of the threading and message handling complexities that the applications would otherwise have to handle themselves. It also serves the purpose of achieving OS independence by hiding the implementation details of the OS for relieving applications from run-time complexities including message routing/filtering and message-related resource handling. A major responsibility of the Native Application Core is to hide the details of the start-up and shutdown phase of an application and in the handling of messages.

The Middleware Support Services module 236 provides services to the OPA domain that are common for the different handlers or that need to be centralized, e.g., object management and resource supervision.

The Native Extension Plug-in module(s) 238 can be seen as an optional extension of the platform assembly functionality through the OPA Interface and Handlers module 234. These module(s) are subject to the same interface guidelines, paradigms and mechanisms that rule and apply to the OPA Interface and Handlers module 234. The OPA Native Extension Plug-ins 238 may only access the platform functionality through the OPA Interface and Handlers module 234. Several Extension Plug-in modules can simultaneously exist in the system.

The Native Extension Plug-in module(s) 238 is subject to the following characteristics:
1. Its purpose is to extend functionality in the platform assembly in terms of offering higher level services, which can be used by user applications.
2. It exports its services via a component-based OPA interface (ECM)
3. It imports its services via the component-based OPA interface (ECM).

The UI Tool-kit API domain 208 supplies a set of visual objects that can be used to build a user interface to an application. These objects are also allowed for use by the Java ExE environment. In addition, the UI Tool-kit API domain provides support for other UI-related functions such as text rendering, input methods and the handling of text resources.

Figure 8:
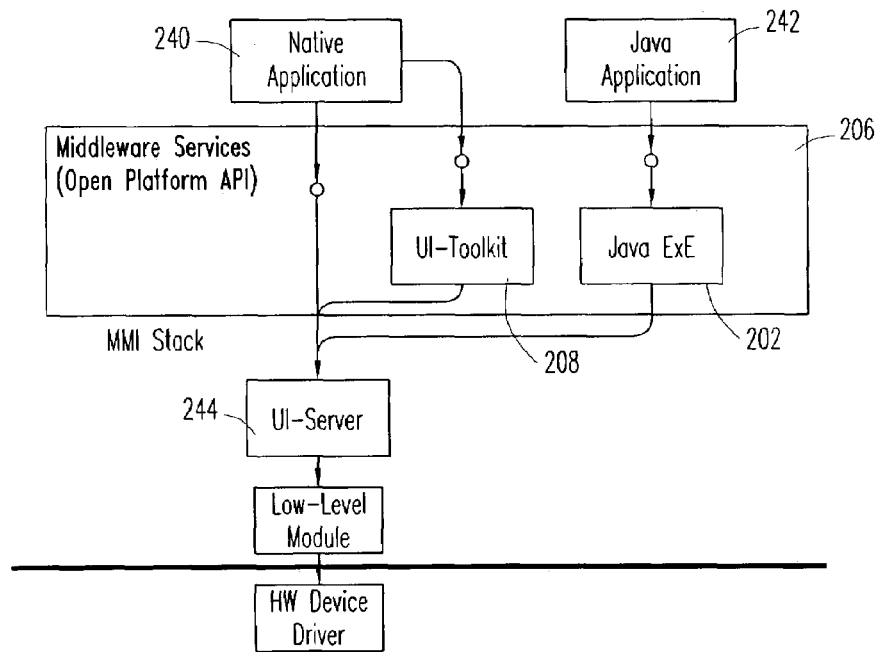
FIG. 8 is a block diagram that schematically illustrates the manner in which the UI Tool-kit API enables an application to use a UI-server of the platform assembly of FIGS. 1-3 directly through the Open Platform API domain according to another exemplary embodiment of the invention.

A major function of UI Tool-kit API domain 208 is to enable faster development of applications by introducing higher level support for frequently needed functions. It also helps maintain common principles for the appearance and behavior of different applications, even those developed independently of one another. Applications may or may not use Tool-kit API domain 208 to present graphics and to handle user input. FIG. 8 is a block diagram that schematically illustrates the manner in which an application, e.g., a native application 240 or a Java (non-native) application 242 can use a UI-server 244 of the mobile terminal platform assembly 12 directly through the Open Platform API domain 206.

If desired, some parts of UI Tool-kit 208 can be replaced or modified by a user of mobile terminal platform assembly 12.

The middleware services layer component according to the present invention provides a number of advantages:
1. Application software can be loaded, installed and run in the mobile terminal platform assembly separately from the software of the platform assembly.
2. Backwards compatibility is provided, i.e., users are able to reuse existing application software notwithstanding upgrades or other modifications to the platform assembly software.
3. The access mechanism between the applications and the platform assembly is consistent for all functionality offered by the platform assembly. This will speed up application software development because all software developers are trained on the same mechanisms irrespective of the functionality. Memory consumption of the application software will also be reduced because all applications utilize the same support mechanisms of the platform assembly.

With the middleware services layer component of the present invention, it is also possible for users to add their own interfaces to the platform assembly. This is achieved by the user writing their own plug-ins which will be seen as part of the middleware services layer component from the application's viewpoint. This permits users to tailor the platform assembly to their own needs, and, at the same time, to be able to reuse their applications on new platform assembly configurations.

Figure 9:
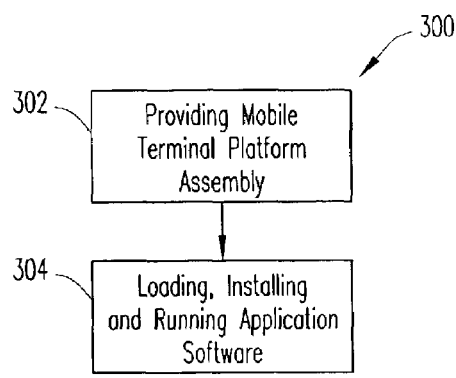
FIG. 9 is a flow chart that schematically illustrates steps of a method for enabling use of a mobile terminal platform assembly for a mobile terminal according to another exemplary embodiment of the present invention.

FIG. 9 is a flow chart that schematically illustrates steps of a method for using a middleware services layer of a mobile terminal platform assembly for a mobile terminal according to another exemplary embodiment of the present invention. The method is generally designated by reference number 300 and begins with providing a mobile terminal platform assembly for a mobile terminal (step 302). The mobile terminal platform assembly includes a software services component and a middleware services layer containing at least one application programming interface (API) for providing access to the mobile terminal platform assembly. Application software is then loaded, installed and run in the mobile terminal platform assembly via the middleware services layer (step 304) for enabling use of the mobile terminal platform assembly.

While what has been described constitutes exemplary embodiments of the invention, it should be understood that the invention can be varied in many ways without departing from the scope thereof For example, although in the exemplary embodiments described herein, the middleware services layer component supports two application environments, other environments can also be supported as needed or desired for particular user applications. Also, although the present invention has been described primarily as being used in a third generation cellular telecommunications system, the invention can also be used in second generation and other cellular telecommunications systems, and in other wireless telecommunications systems such as, for example, a Bluetooth system. Because the invention can be varied in many ways, it should be recognized that the invention should be limited only insofar as is required by the scope of the following claims.

We claim:

1. A middleware services layer for a platform system for a mobile terminal for a wireless telecommunications system, said platform system including a mobile terminal platform assembly having a software services component, and application software loaded, installed and run in said mobile terminal platform assembly, said middleware services layer comprising:
   at least one application programming interface (API) for providing access to the mobile terminal platform assembly for loading, installing and running said application software in said mobile terminal platform assembly; and
   an application framework for loading, installing and running said application software, wherein the organization of the software services component with the middleware services layer define a layered architecture.

2. The middleware services layer according to claim 1, wherein said middleware services layer comprises a component of said mobile terminal platform assembly.

3. The middleware services layer according to claim 2, wherein each of said at least one API comprises at least one software module.

4. The middleware services layer according to claim 2, wherein said at least one API includes a native API domain and a non-native API domain.

5. The middleware services layer according to claim 4, wherein said at least one API comprises at least one of a Java Execution Environment API domain, an Open Application Framework API domain, an Open Platform API domain and a UI Tool-kit API domain.

6. The middleware services layer according to claim 5, wherein said Java Execution Environment domain API includes a Java Environment Manager module, a Java Application module and a Java Support Layer module.

7. The middleware services layer according to claim 5, wherein said Open Application Framework API domain includes an Application Manager for intercepting Java applications, and a Secure Access Manager module for deciding whether the Java application should be permitted access to services of the mobile terminal platform assembly via the Java Execution Environment API domain.

8. The middleware services layer according to claim 5, wherein said Open Application Framework API domain includes an Application Manager module for handling registration, installation, start, stop, uninstall and removal of applications.

9. The middleware services layer according to claim 5, wherein said Open Platform API domain includes a Native Application Core module for hiding specific details of a start-up and shut-down phase of an application and in the handling of the messages of the mobile terminal platform assembly and for relieving applications from run-time complexities including message routing/filtering and message-related resource handling.

10. The middleware services layer according to claim 5, wherein said Open Platform API domain includes a Native Extension Plug-in module(s) to extend functionality of the mobile terminal platform assembly by providing higher level services which can be used by applications.

11. The middleware services layer according to claim 5, wherein the UI Tool-kit API domain provides a set of visual objects that can be used to build a user interface in the middleware services layer for a user application.

12. The middleware services layer according to claim 1, wherein said wireless telecommunications system comprises a cellular telecommunications system.

13. The middleware services layer according to claim 12, wherein said cellular telecommunications system comprises a third generation cellular telecommunications system.

14. A mobile terminal platform assembly for a platform system for a wireless telecommunications system, comprising:
   a software services component;
   a middleware services layer component, said middleware services layer component comprising at least one application programming interface (API) for providing application software with access to the mobile terminal platform assembly for loading, installing and running said application software in said mobile terminal platform assembly; and
   an application framework for loading, installing and running said aplication software, wherein the organization of the software services component with the middleware services layer define a layered architecture.

15. The mobile terminal platform assembly according to claim 14, wherein said at least one API comprises a plurality of APIs.

16. The mobile terminal platform assembly according to claim 15, wherein said plurality of APIs include a native API domain and a non-native API domain.

17. The mobile terminal platform assembly according to claim 16, wherein said plurality of APIs include a Java Execution Environment API domain, an Open Application Framework API domain and an open Platform API domain.

18. A method for using a middleware services layer and an application framework of a mobile terminal platform assembly for a mobile terminal, comprising:
   providing a mobile terminal platform assembly that includes a software services component, said middleware service layer, said middleware services layer including at least one application programming interface (API) for providing access to the mobile terminal platform assembly; and
   loading, installing and running application software in said mobile terminal platform assembly via said middleware services layer and application framework, wherein the organization of the software services component with the middleware services layer define a layered architecture.

19. The method according to claim 18, wherein said application software is loaded, installed and run in said mobile terminal platform assembly via one of a native API domain and a non-native API domain.

20. The method according to claim 18, wherein said application software is loaded, installed and run in said mobile terminal platform assembly by a manufacturer of said mobile terminal platform assembly.

21. The method according to claim 18, wherein said application software is loaded, installed and run by a manufacturer of said mobile terminal.

22. The method according to claim 18, wherein said application software is loaded, installed and run by an end user of said mobile terminal.

* * * * *

UNITED STATES PATENT AND TRADEMARK OFFICE
CERTIFICATE OF CORRECTION

PATENT NO.       : 7,415,270 B2                                      Page 1 of 1
APPLICATION NO.  : 10/359772
DATED            : August 19, 2008
INVENTOR(S)      : Wilhelmsson et al.

It is certified that error appears in the above-identified patent and that said Letters Patent is hereby corrected as shown below:

On the Face Page, in Field (73), under "Assignee", in Column 1, Line 1, delete "L M" and insert -- LM --, therefor.

On Page 2, in Field (56), under "OTHER PUBLICATIONS", in Column 2, Line 44, delete "Client-Serer" and insert -- Client-Server --, therefor.

In Column 6, Line 40, after "code execution)" insert -- . --.

In Column 7, Line 29, delete "2232," and insert -- 232, --, therefor.

In Column 7, Line 67, after "(ECM)" insert -- . --.

In Column 8, Line 67, delete "thereof" and insert -- thereof. --, therefor.

In Column 10, Line 25, in Claim 14, delete "aplication" and insert -- application --, therefor.

Signed and Sealed this

Second Day of June, 2009

JOHN DOLL
*Acting Director of the United States Patent and Trademark Office*